Figures 1, 2:
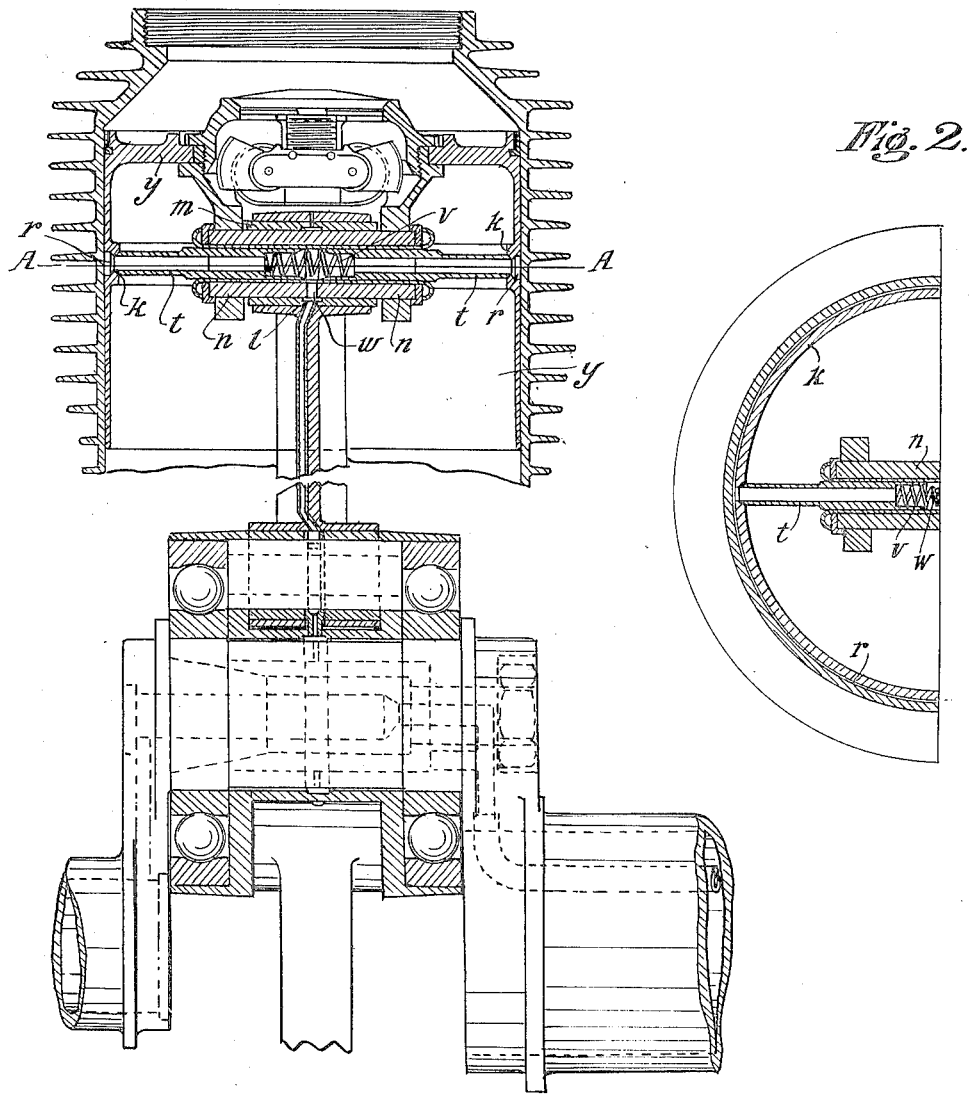

J. ADAMS.
LUBRICATION OF INTERNAL COMBUSTION ENGINES.
APPLICATION FILED APR. 14, 1913.

1,088,510.

Patented Feb. 24, 1914.

UNITED STATES PATENT OFFICE.

JORDAN ADAMS, OF LONDON, ENGLAND.

LUBRICATION OF INTERNAL-COMBUSTION ENGINES.

1,088,510.   Specification of Letters Patent.   Patented Feb. 24, 1914.

Application filed April 14, 1913. Serial No. 760,987.

*To all whom it may concern:*

Be it known that I, JORDAN ADAMS, a subject of the King of Great Britain, and a resident of No. 274 Bank Chambers, Holborn, London, W. C., England, have invented new and useful Improvements Relating to the Lubrication of Internal-Combustion Engines, of which the following is the specification.

This invention relates to improvements in the lubrication of the cylinders of internal combustion engines particularly applicable to the lubrication of rotary explosion engines.

The invention essentially consists in conducting between the walls of the piston and the cylinder in the form of a thin layer or film a portion of the oil which has just lubricated the head of the connecting rod, this oil being passed through the pivot or gudgeon pin of the piston into an annular groove formed in the thickness of the piston. In this manner an absolutely regular and constant lubrication of the cylinder is obtained without any loss of the oil.

In the accompanying drawings:—Figure 1 shows in longitudinal section the lubricating device applied by way of example to the cylinders of an internal combustion engine of the type known under the name of the "Gnome" engine. Fig. 2 is a cross-section along the line A—A of Fig. 1.

The piston Y is integral with an annular boss $k$ in which is formed an annular groove $r$ for distributing the oil in the form of a thin layer or film between the walls of the piston and the cylinder. In this groove and along one diameter two metal tubes telescopically mounted at the interior of the pivot or gudgeon pin $n$ of the piston open out. These tubes rest elastically by means of a spring $v$ against conical abutments reserved on the projection $k$, so as hermetically to connect up with the annular groove $r$. The oil passes to the bearing $m$ through a groove $l$ formed in the latter, and then passes through the channel or passage $w$ to the interior of the two tubes $t$ and from there passes to the annular groove $r$ where it assures the lubrication of the cylinder as described above.

Instead of the tubes $t$ resting elastically against the projection $k$ they may be connected up rigidly to the piston. It would suffice for this to screw them for example into the projection by reserving on the latter a threaded part with a conical seat and on the tubes a hexagonal head permitting of mounting them by means of a key.

In a rotary cylinder engine the force conveying the oil to the hollow gudgeon pin or its extensions from the stationary crank pin will of course be centrifugal, while in other engines, this force will be that supplied by a pump.

What I do claim as my invention and desire to secure by Letters Patent is:—

1. A lubricator including a piston having a passage for conducting lubricant extending along its rod portion and connected at its outer end with a suitable source of supply, said piston having a gudgeon pin at its head portion, the gudgeon pin being provided with an opening communicating with said passage, and a tube communicating with said opening, said tube extending from the gudgeon pin to the wall of the piston head and communicating with the exterior thereof for conducting lubricant to the interior of the cylinder.

2. A lubricator including a piston having a passage for conducting lubricant extending along its rod portion and connected at its outer end with a suitable source of supply, said piston having a gudgeon pin at its head portion, the gudgeon pin being provided with an opening communicating with said passage, and oppositely disposed tubes slidably mounted in the said pin and communicating with the said passage and with the exterior of the piston head, and yieldable means for urging the tubes outwardly.

3. A lubricator including a piston having a passage for conducting lubricant extending along its rod portion and connected at its outer end with a suitable source of supply, said piston having a gudgeon pin at its head portion, the gudgeon pin being provided with an opening communicating with said passage, oppositely disposed tubes slidably mounted in the said pin and communicating with the said passage and with the exterior of the piston head, and a spring interposed between the inner ends of the tubes for urging the same outwardly.

4. A lubricator including a piston having a lubricant passage extending along its rod portion and connected at its inner end with a suitable source of supply, said piston having a transverse gudgeon pin at its head portion and provided at points opposite the ends of the gudgeon pin with lateral openings, the gudgeon pin being also provided with a duct communicating with said passage, and tubes mounted in the gudgeon pin communicating at their inner ends with said duct and having their outer ends in communication with the said openings.

5. A lubricator including a piston having a lubricant passage extending along its rod portion and connected with a suitable source of supply, said piston having a transverse gudgeon pin and provided at points opposite the ends of the gudgeon pin with interiorly tapered lateral openings, tubes having conical outer ends fitting the said tapered openings, and having their inner ends in communication with the said duct.

6. A lubricator including a piston having a lubricant passage extending along its rod portion and connected with a suitable source of supply, said piston having a transverse gudgeon pin and provided at points opposite the ends of the gudgeon pin with lateral openings and with an exterior groove connecting the said openings, the gudgeon pin being provided with a duct communicating with said passage, tubes extending from the said gudgeon pin and having their outer ends in communication with the said openings, and communicating at their inner ends with the said duct.

JORDAN ADAMS.

Witnesses:
J. D. Roots,
O. J. Worth.